(12) United States Patent
Anson

(10) Patent No.: US 9,462,467 B2
(45) Date of Patent: Oct. 4, 2016

(54) SECURE PROCESSING SYSTEM FOR USE WITH A PORTABLE COMMUNICATION DEVICE

(71) Applicant: Mark Rodney Anson, Sydney (AU)

(72) Inventor: Mark Rodney Anson, Sydney (AU)

(73) Assignee: NOWWW.US Pty Ltd., Darlington, NSW (AU)

( * ) Notice: Subject to any disclaimer, the term of this patent is extended or adjusted under 35 U.S.C. 154(b) by 0 days.

(21) Appl. No.: 14/097,860

(22) Filed: Dec. 5, 2013

(65) Prior Publication Data

US 2014/0155032 A1 Jun. 5, 2014

Related U.S. Application Data

(60) Provisional application No. 61/733,853, filed on Dec. 5, 2012.

(51) Int. Cl.
*H04M 3/16* (2006.01)
*H04W 12/06* (2009.01)
*H04L 29/06* (2006.01)

(52) U.S. Cl.
CPC ............ *H04W 12/06* (2013.01); *H04L 63/083* (2013.01); *H04L 63/0861* (2013.01); *H04L 63/0876* (2013.01)

(58) Field of Classification Search
USPC ...................... 455/411; 235/379, 380; 726/18
See application file for complete search history.

(56) References Cited

U.S. PATENT DOCUMENTS

| | | | |
|---|---|---|---|
| 8,479,983 B1* | 7/2013 | Block et al. ................... | 235/379 |
| 2010/0321208 A1* | 12/2010 | Etchegoyen ........ | H04W 76/007 340/909 |
| 2012/0281594 A1* | 11/2012 | Stewart ................. | H04W 16/14 370/259 |
| 2013/0262857 A1* | 10/2013 | Neuman ................. | H04L 63/08 713/155 |
| 2014/0059671 A1* | 2/2014 | Celi et al. ........................ | 726/18 |

FOREIGN PATENT DOCUMENTS

EP    2267969 A2 * 12/2010    ............... G08G 1/07

* cited by examiner

*Primary Examiner* — David Q Nguyen
(74) *Attorney, Agent, or Firm* — Vitality IP; Saleh Kaihani

(57) ABSTRACT

A machine-readable medium encoded with instructions to execute steps comprising: authorizing access to a system using a location of a portable communications device.

6 Claims, 9 Drawing Sheets

US 9,462,467 B2

SECURE PROCESSING SYSTEM FOR USE WITH A PORTABLE COMMUNICATION DEVICE

This application claims priority from U.S. Provisional Patent Application No. 61/733,853 entitled "Secure processing system for use with a portable communication device" filed Dec. 5, 2012. The Provisional Application is incorporated by reference as though fully set forth herein.

BACKGROUND OF INVENTION

1. Technical Field

The present invention pertains to the field of processing electronic transactions using a portable communication device, with particular reference, but not limited to, processing payments using a mobile phone.

2. Background Art

Portable communication devices and in particular mobile phones have been subject to theft and abuse. Attempts to protect legitimate users of portable devices have included password encryption and placing caps on mobile phone credits. Nevertheless, passwords are subject to guessing and so unauthorized access to a portable communication device can disclose sensitive information. Further, to the above, even if transactions performed on credit using a portable communication device are subject to rebate to a user who can establish unauthorized use of the device by a third party, the time involved in unwinding the transactions, in addition to emotional upset can be costly.

General problems with background art: despite the best attempts to secure portable communication devices against unauthorized access, it is a fact that theft and password tampering still present major security problems.

Specific problems with the background art:
despite the best efforts to improve password protection of portable devices, improvements in password hacking technology has meant that for each advance in encryption, new technologies are developed to bypass security measures.

SUMMARY OF INVENTION

Technical Problem

To ameliorate some of the effects of the general problems and the specific problems as recited above and in particular to provide, at least in part, an improved way of protecting mobile communication devices against unauthorized use and abuse.

Technical Solution

Central to the inventor's discovery is the realization that spatial 'location' of a device can play a significant role in protecting a portable communication device against unauthorized access—that is that spatial location can be used as a security parameter (for credentialed identification purposes) not just a tracking parameter.

Advantageous Effects

Advantageous effects include: limiting access to a portable communication device by unauthorized persons and in particular ensuring that payments made by using the device are made securely.

In one broad aspect of invention there is provided a method for using spatial location of a portable communication device as a way of preventing unauthorized access to the device for purposes of authorizing a transaction.

In a related aspect, the invention includes a machine-readable medium encoded with instructions to execute steps including authorizing access to a computer system based upon location of a portable communication device.

In another related aspect of the invention an integrated circuit for authorizing access to a computer system, which includes a first comparator used to authenticate a password; a second comparator used to authenticate a device identifier; a third comparator used to authenticate a location identifier; so constructed and arranged that the first, second and third comparators can be used to authenticate a propagated signal containing the password, the device identifier and the location identifier.

In still another related aspect of the invention a method for authorizing access to a computer system is provided, including steps of: receiving a password at the system in a form of a propagated signal; receiving a device identifier at the system in the form of the propagated signal; receiving a location identifier at the system in the form of the propagated signal; so constructed and arranged that a swipe gesture can be used to transmit the signal from a mobile communication device to the system.

DETAILED DESCRIPTION

Best Mode

DEFINITIONS AND TERMS

The description in the body of the specification pertains to 'preferred' modes of invention. Accordingly, features recited in the body of the specification should not be construed to be essential features of the invention unless explicitly indicated. Further, any reference in the body of the specification to the expression 'invention' should be construed to imply a reference to preferred embodiments only.

For purposes of the present specification it is to be understood that machine-readable instructions can be encoded in the form of software instructions on a machine-readable medium and firmware on a machine-readable medium; further hardware capable of executing a process otherwise undertaken by the instructions (using a microprocessor or a micro-controller) can alternatively be implemented using a digital circuit.

It is further understood, so to as apply a purposive construction and to ascribe a plain meaning to words used in this specification, that physical items recited in the specification and processes are deemed to occur in the context of electronics and telecommunications.

Passwords are to be understood to include information 'known' to a user, where the information corresponds to predetermined data stored in a database for purposes of authentication. It is further preferred that data, including passwords, stored on devices, in packets and in credentialing entities is encrypted.

A device identifier, as recited below, can in a broad form of invention correspond to any form of indicia capable of identifying a device including IMEISV numbers and MEID numbers.

Figure 1:
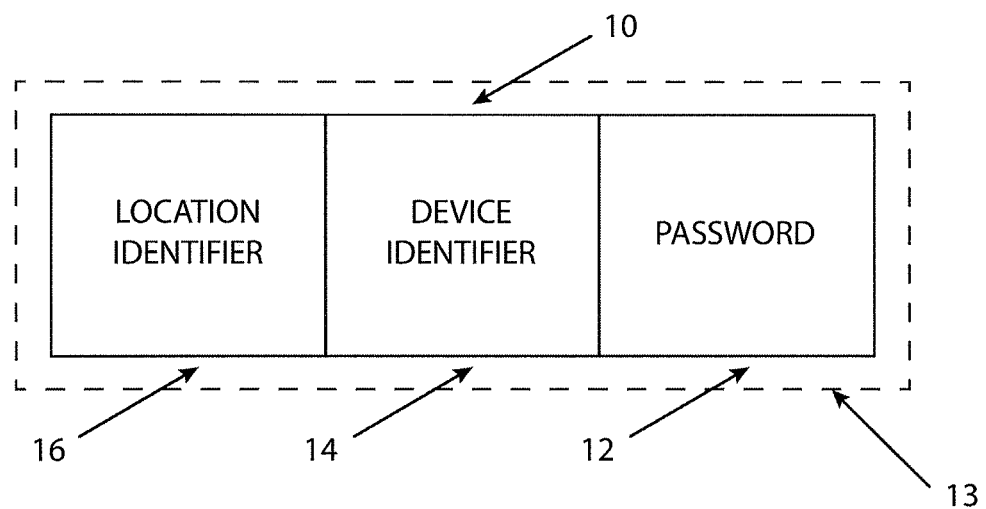
FIG. 1 discloses a propagated signal in a preferred mode of invention.

FIG. 1 shows a propagated signal in the form of a data packet as one preferred mode of invention, where the data packet 10 is sent from a portable communication device to a payment processing entity. The data packet 10 comprises the password 12 (preferably all aspects of the packet 10 being encrypted), the device identifier 14 in respect of the portable communication device and a location identifier 16 with respect of the location of the device. In a preferred mode, the device identifier 14 is the device's IMEI number. In a preferred mode, propagated signal 10, appearing in the preferred embodiment seen in FIG. 1 as the data packet 10 will be used to authenticate a payment authorization for a product\service by sending the data packet 10 to a payment processing entity (not shown). Further to the above, an additional layer of encryption 13 (symmetric or asymmetric) can be used to safeguard the packet 10.

Mode for Invention

Figure 2:
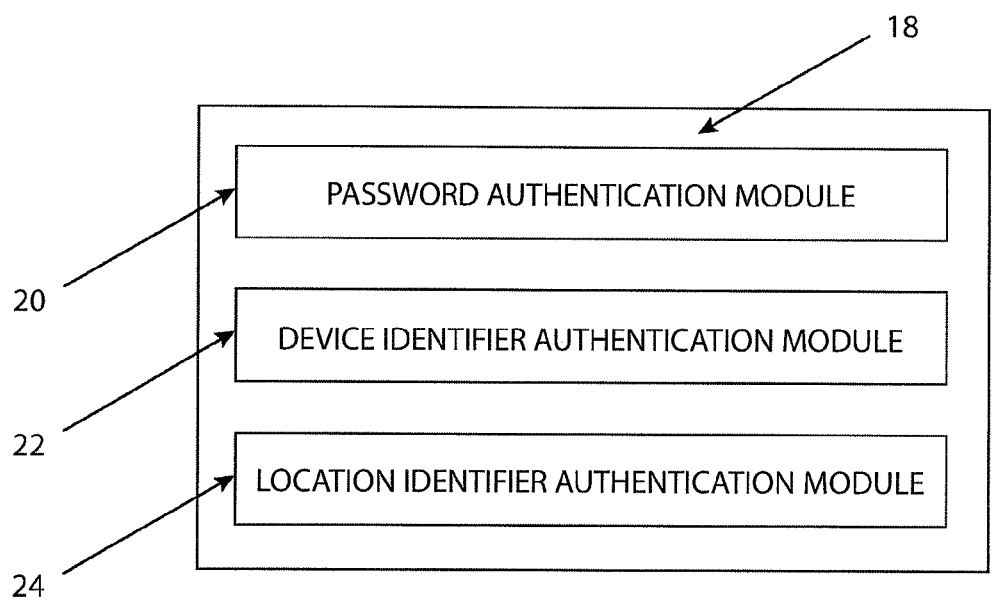
FIG. 2 discloses a preferred mode of invention in generic form.

FIG. 2 discloses a preferred mode of invention in generic form, in which instructions are encoded on an electronic machine-readable medium. Alternatively, digital circuit modules including comparators can execute the same process as prescribed by the instructions. It is important to realize that while the preferred mode as illustrated in FIG. 2 shows all modules appearing in close association, it is to be understood that this is not in fact necessary in all embodiments. In particular modules 20-24 can be combined, at least in part, and modules 20-24 can appear in separate spatial locations as members of different devices. What is necessary for proper credentialing, however, is that all modules 20-24 each yield a value of true, that is a digit '1', in respect of an AND truth table, so as to authenticate a transaction as being valid.

In one preferred embodiment, FIG. 2, can be seen to include a machine-readable medium encoded with instructions to perform a credentialing operation, including, but not limited to, payment authorization. The medium 18 includes instructions at 20 to recognize a password. At 22, instructions are encoded to uniquely identify a device (typically but not limited to identification by way of an IMEI number, however any unique device identifier can suffice). At position 24 instructions are encoded to identify the location of a portable communications device.

The medium 18 can be located on the portable communications device. However, in a different preferred mode, security concerns could mandate that the medium 18 is located on a device at the secure office of a payment processing entity. Broadly, credentialing can occur both on the mobile communication device and also at the payment processing entity.

In a preferred generic mode of invention, the features shown in FIG. 2 can be envisaged to take on a plurality of different forms. The password authentication module 20 can include a biometric data certification module, alternatively the password authentication module can be constructed and arranged to act upon a password that has been generated using a plurality of indicia including coloured objects, objects having specific geometric forms where the password is generated in association with a user's hand position in proximity to a touch screen while the user executes a swipe gesture. As previously recited, while a preferred mode can include an IMEI identifier other modes can be envisaged in which any form of indicia, including MEID numbers, unique to a particular portable communication device, can be used to identify the device.

Preferred embodiments of the present invention can include software and firmware as recited above. However, preferred embodiments are also adapted for hard-wired encoding in the form of a digital integrated logic chip.

Generally speaking, micro-controllers and microprocessors have increasingly replaced hard-wired integrated circuits because of the ease of encoding and also sophistication of the controllers (flexibility) and processors.

Typically, a high level language like C or an application specific package can be used to encode instructions that are then translated into machine code in order to program the controller or the processor. However, one drawback presents itself as is seen with software in general and that is that controllers and processors are not only easily programmed they can also be easily re-programmed in many cases, by unauthorized persons.

Accordingly, in order to deal with the inherent vulnerability associated with software to hacking, classical integrated circuitry can, in some cases, provide greater protection than software controlled processors and controllers.

In so far as embodiments of the present invention are concerned the notion of 'location' as a security parameter can in one preferred mode, be dealt with by way of use of a magnitude comparator integrated circuit. Classically, comparators are used to determine if, in respect of two numbers A and B, whether A for example is greater than or equal to B. This notion of an integrated circuit comparator can be extended to embodiments of the present invention. For example, while the location of the portable communication device can be 'precise' in the sense of asking whether or not the device is located in a specific office, a specific building or a specific suburb, in many cases such precision could either not be obtainable nor required. For example, in the case of triangulation using mobile communication towers all that can be said is that estimates can be made as to where the device is located at any specific time to within a certain degree of accuracy. Nevertheless, the 'estimate' could be adequate for security purposes to the extent that the location of the device is associated with a range of permissible values that are linked to possible and also permissible locations for the device.

In contrast to mere 'estimates' of locations, precise GPS navigation for purposes of global mapping of each particular geographical location can be numerically encoded; subdivisions of any location can then be represented by further extending the numerical sequence associated with a first location in order to further prescribe an area with greater particularity for purposes of determining a location identifier. Accordingly, the question pertaining to location then becomes a question of deciding whether a particular location identifier 24 as seen in FIG. 2 fits within a given numerical range. The notion of determining location identifiers can be generalized beyond mobile cell location and GPS navigation to use any method of locating a device including multilateration.

The broad principle of digital comparison can be demonstrated by consideration of classical integrated chips including the 74HC85 series chips that can be used to compare the magnitude of two numbers. Accordingly, while there has been a teaching away from using IC comparator chips in favour of using microprocessors and micro-controllers, the increased security, arguably associated with hard wired IC chip comparators makes for use of the IC chip version of any software embodiment as paradoxically being preferred in a security context despite the argument that chips are associated with a reduction in flexibility in comparison with software encoded microcontrollers and microprocessors. It must of course be said that 'any form' of digitised encoding of location (a location identifier) can be used provided that either a reference table or a functional relation between location identifiers can be used to determine the location of the device once the location identifier is provided. In the case of a reference table, the table can further be subject to system of encryption to make guessing of numerical ranges by persons seeking to illegally and falsely replicate a location identifier extremely difficult.

In use, one advantage of using a hard wired IC (integrated circuit) chip for magnitude comparison purposes is that if the digitised format for a location identifier does not fall within a given range, indicative of a physical location of a portable communication device, then an attempt to authorize a purchase by way of a swipe gesture (and associated transmission of a data packet) can be rejected by the payment processing entity. Similarly, cross synchronization across data including past and present histories for a user's physical location (location identifiers), device identity (IMEI numbers in one embodiment), passwords (potentially including biometric data and alternatively including voice recognition data) can all simultaneously be 'combined' in an authentication process.

In addition to the use of magnitude comparators, simple digital comparators can be used to determine equality between numbers. The simplest example of a hard wired IC chip comparator for illustrative discussion purposes to illustrate this concept is the classical 1-bit comparator that outputs the digit '1' if two single binary digit inputs are equal. Generalizing upon the notion of the 1-bit comparator, multi-bit comparators can be constructed, which can in a simple form be formed from parallel 1-bit comparators that will output a '1' if two multi-bit numbers are equal. This notion can be used to construct two multi-bit comparators, one for purposes of comparing password identity (identity between a stored password and an input password) and one for comparing device identity (identity of a stored IMEI number and an input number device identifier).

In one preferred embodiment, FIG. 2, can take the form of a plurality of AND circuits, each circuit including comparators and arguably in the case of location, at least one magnitude comparator (and in many cases at least two comparators for range comparison purposes). The circuits can be configured in parallel so that an output of the digit '1' will be indicative of a credentialed input (that can include a swipe gesture)—a '1' being output from each comparator for purposes of credentialing a user's password, a device identifier and a location identifier (the credentialed result only being validated if a Boolean truth table for AND logic yields a digit of '1'—true for all inputs).

INDUSTRIAL APPLICABILITY

Figure 3:
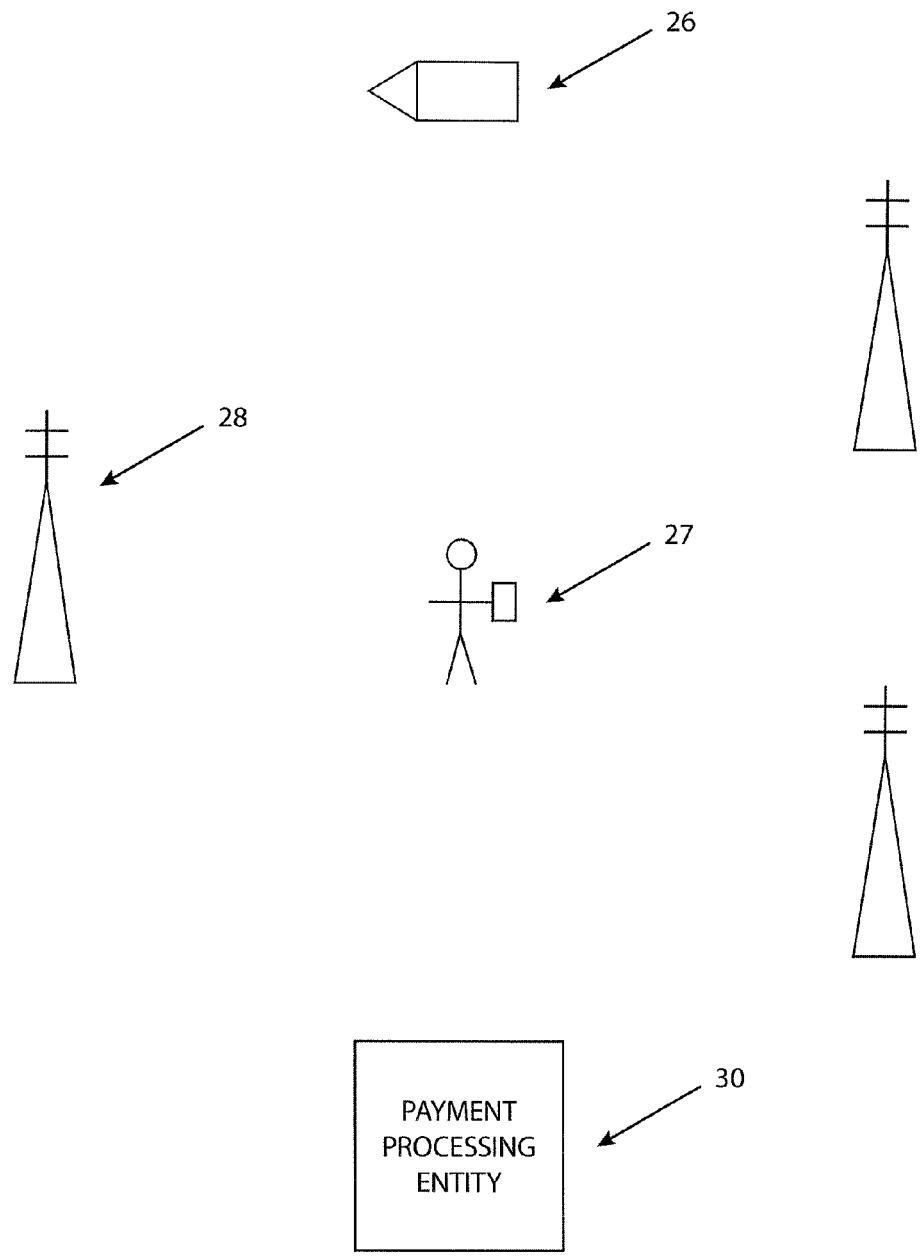
FIG. 3 discloses a preferred mode of invention in use.
Figure 4:
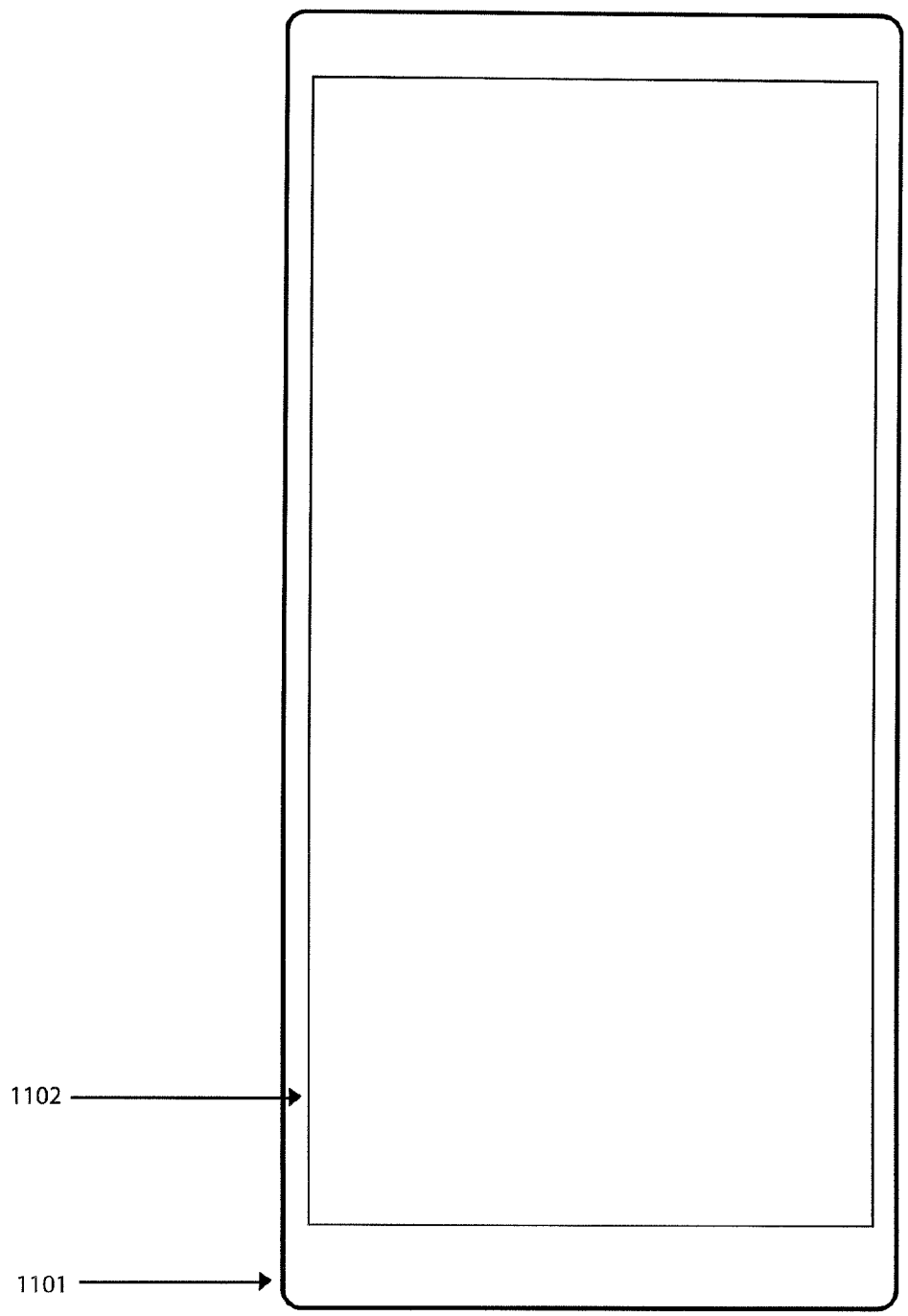
FIG. 4 discloses a viewable screen area of a mobile phone.

FIG. 3 discloses a further preferred mode of invention, in use. As seen in FIG. 3 a satellite GPS system 26 can be used to determine a user's location. The user carries a portable communication device 27 taking the form of a mobile phone in a preferred embodiment. In addition to the satellite 26, the mobile phone communication towers 28 can be used to triangulate upon the user's location (or alternatively to merely define the user as existing within a single tower's cell without the need for additional precision arising out of triangulation). Once the user's location has been determined (a location identifier having been generated), then the propagated signal seen as a data packet 10 in FIG. 1 can be transmitted to the payment processing entity 30 for authorization of a payment transaction. In a preferred embodiment the means illustrated in FIG. 3 can be located at the payment processing entity 30 (alternatively secure and encrypted credentialing means can be located in the device 27 or in both the device 27 and in the payment processing entity 30).

In a preferred embodiment at least one of the components in the propagated signal seen in FIG. 1 could be transmitted separately to other components of the signal. Further to the above, centralization of the means for processing the location identifier, the password and the device identifier can be used to impede access to encryption and authorization (credentialing) technology.

Further to above and in relation to the notion of 'combination' and synchronization of security features, it is observed that in principle, location of the portable communication device could provide, in itself, a crude form of credentialed access to an electronic system. However, a combination of features based upon passwords, device identifiers, location identifiers and encryption (symmetric and asymmetric) of signals can all be used either individually, in pairs or as at least three items that permit authorization of a user for purposes of entry into an electronic system and preferably for purposes of executing a secure payment. However, the notion of 'combination' can be taken further. For example, in a preferred embodiment not only can 'current' information be made available to credential a secure transaction, however, 'past' information (a user's history) can be used to credential a transaction, that is a user's electronic records can be used to determine, in a preferred embodiment, if a payment transaction is 'consistent' with the user's prior history or inconsistent with the prior history, hence raising a question as to fraudulent tampering with the user's transaction accounts. In particular, if the mobile communication device is identified as being located in a part of the State of New York, USA and then several minutes later the device is identified as being located in Sydney Australia, clearly a logical impossibility has occurred (as current technology does not permit an authenticated user's communication device to cross the world in a matter of minutes). In contrast criminals seeking to gain unauthorized access to a system, in particular, using a user's bank account and only a password for protection could do so from a remote location simply by attempting to guess the password, where the password is not combined with other indicia used to determine if a request to initiate a payment is genuine. It is the notion of cross synchronization (combination) across different forms of security identifiers including passwords, location identifiers, device identifiers (being user specific, location specific and device specific respectively) and combination (synchronization) across time (temporally—using a past history pertaining to a user) that can be used to create a matrix of security parameters that must all mesh (synchronize) consistently so as to authenticate a transaction. Any failure of the parameters to mesh (all yield a true answers as to validity) can then be used to trigger a query as to potential fraud. The trigger could then conceivably be used to initiate manual surveillance of the transaction with a view to prevention of electronic fraud.

APPENDIX

In use, various preferred embodiments in a retail context are discussed below.

FIG. 4

A mobile phone or smartphone device 1101 has a viewable screen area 1102, which has touchscreen functionality. By touching and interacting with the touchscreen a mobile phone user can interact with the device 1101 and with devices that 1101 is connected to via a mobile phone network, wifi network or other types of telecommunications networks.

FIG. 5

Figure 5:
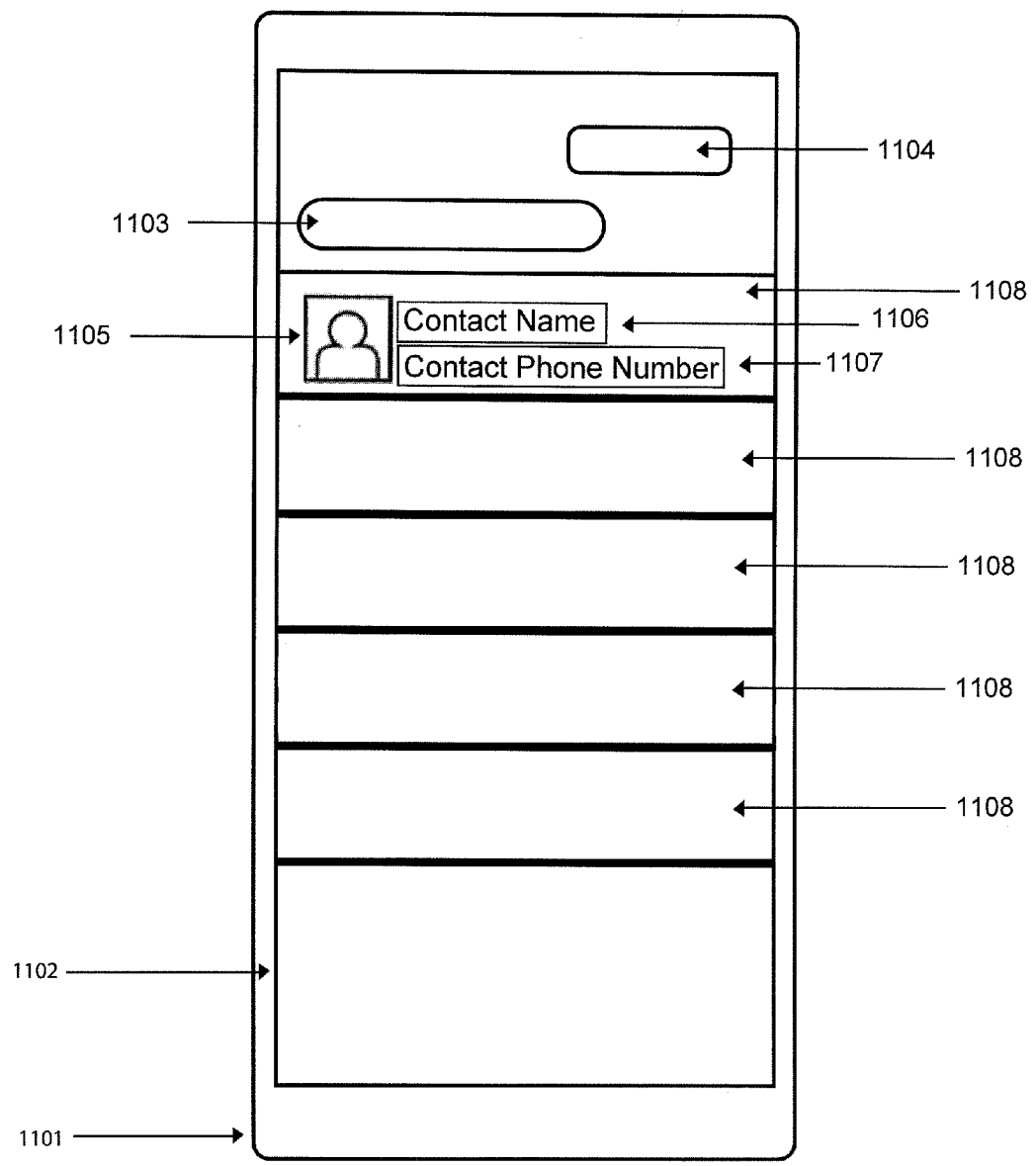
FIG. 5 discloses a list of user contacts on a mobile phone screen.

Smartphones and similar devices contain records or listings of the phone numbers, names and possibly other details of people with whom a phone user is in contact. A list of other people a phone user is in contact with via the phone can be displayed on the screen as is depicted in FIG. 5.

Within the viewable screen area 1102 with touchscreen functionality, a list of items numbered 1108 are shown on the screen. Each of these 1108 areas contains the phone number 1107, name of contact 1106, personal profile image or avatar image 1105, and potentially other details of the contacts—people with whom the phone user communicates.

In the upper area of the touchscreen area 1102 there may be a form field 1103 into which the names of contacts may be entered, and the list of items 1108 below this will be populated with details of people matching the text entered in this 1103 form field. That is, if the characters "ma" are entered in 1103 then the list of items 1108 can display people with names including "Mary Smith", "Mark Harris" and so forth.

In the upper area there is also a button 1104 that, when pushed, will display a new screen where the details of a new Contact can be entered and stored in the database within the mobile phone.

FIG. 6

Figure 6:
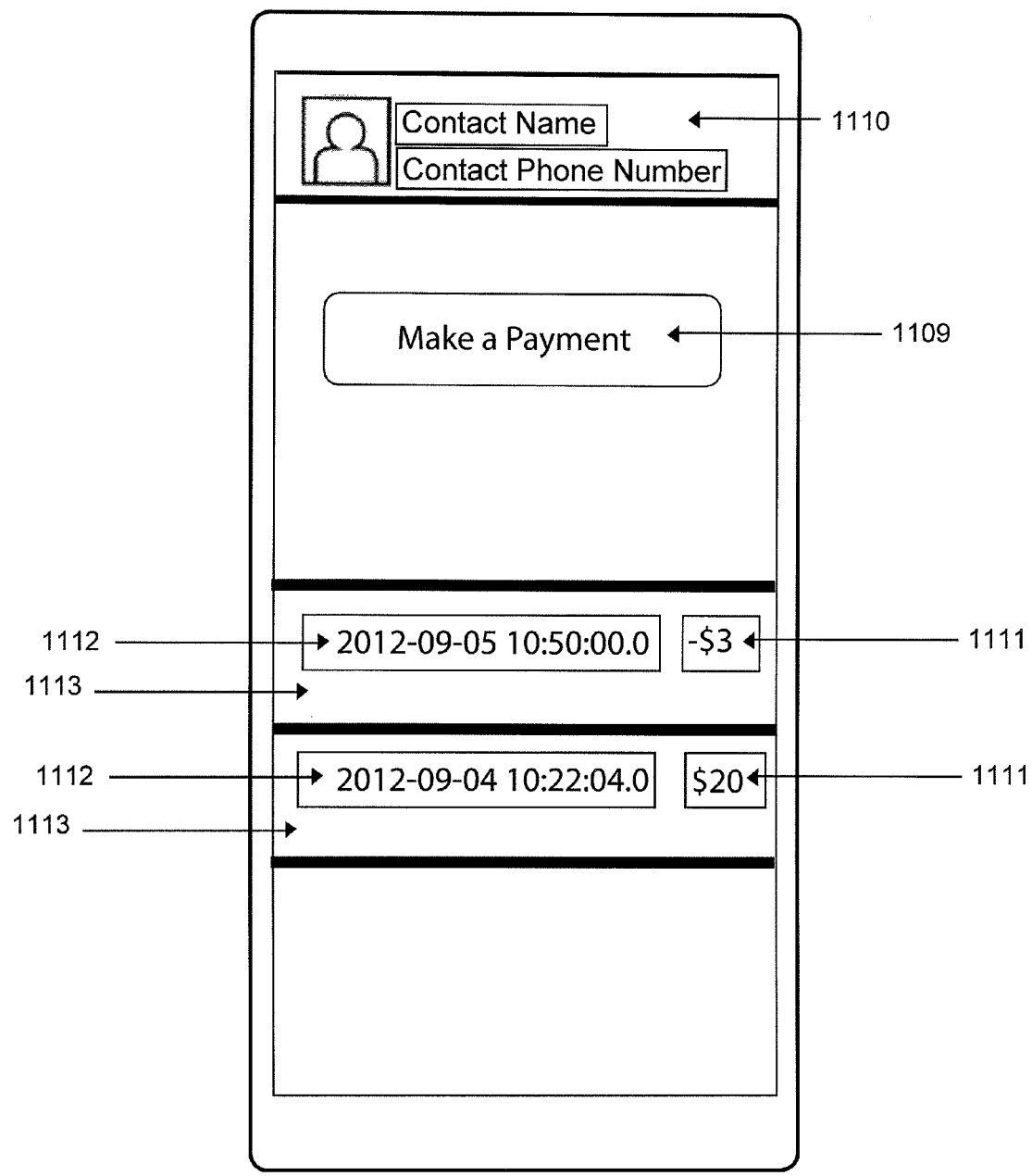
FIG. 6 discloses content information pertaining to a contact and fields to facilitate execution of payment.

When a phone user touches or taps the areas 1106, 1107 or 1105, as seen in FIG. 5, within the area of an individual contact person 1108 then the screen can change to display the content and information shown in FIG. 6.

In the upper section, 1110, of the touchscreen area 1102 the same content 1108 that was displayed in FIG. 5 is again shown, but now in the prominent upper section of the screen.

Beneath this there is a "Make a Payment" button 1109 that when tapped, will commence a process by which the user can transfer money to the particular person 1108 whose details are shown at the top of the screen. Tapping, clicking or touching the button 1109 will cause the screen to change and display the new screen shown in FIG. 7.

Beneath the area 1109 in FIG. 6 is a list of items 1113 that contain details of previous transactions, which were made with the individual person 1108. The various separate items 1113 will have the date and time 1112 of each transaction, as well as the amount 1111 of each transaction. Additional information may also be displayed within the 1113 transaction details area.

FIG. 7

Figure 7:
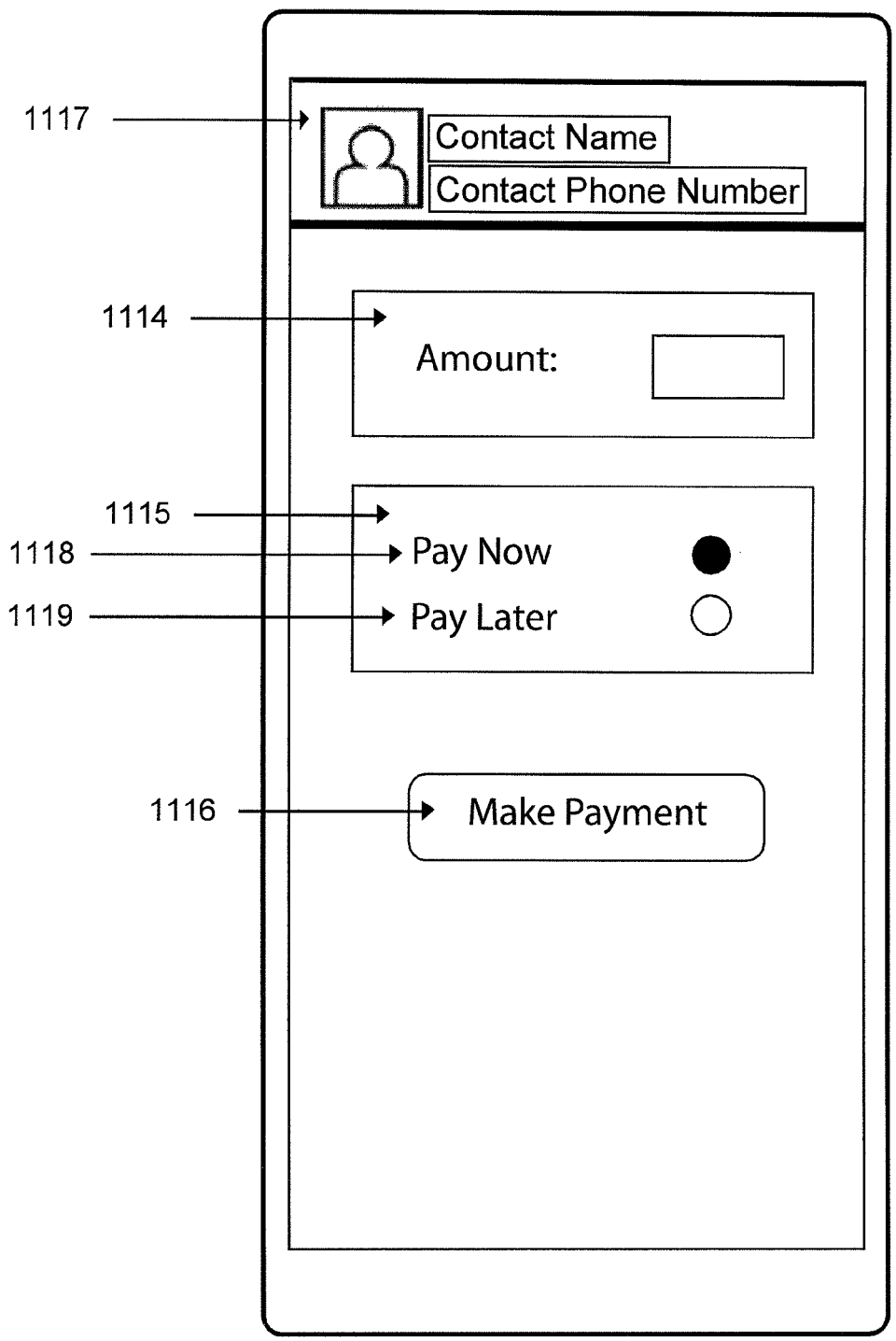
FIG. 7 discloses fields to permit a user to transfer money from the user's account into a third party contact account.

The FIG. 7 shows items on the touchscreen that enable a user to transfer money from their account into the account of another person.

In the upper section 1117 of the touchscreen area 1102, the same content 1108 that was displayed in FIG. 5 is again shown but now in the prominent upper section of the screen.

Beneath 1117 there is a form field 1114 into which the user will enter the amount of money to be transferred. Another area 1115 is also displayed with buttons that enable the user to choose to pay money now (being button 1118) or to pay later (being button 1119).

To make a payment immediately, the user will touch the item 1116 and proceed with making a payment.

When a user touches the pay later button 1119 the screen transforms to show FIG. 8.

FIG. 8

This diagram shows items displayed to a user so that they can transfer money into the account of another person at a date in the future.

A user enters a value in form field 1114 and selects the option 1119 to pay later.

The user then actions item 1120, the schedule payments option, which is a drop down list box with various options, but with the default option "Only Once" currently selected. Other options in this drop down box include options for "weekly", "fortnightly" and "monthly" payments.

Beneath the item 1120 is item 1121, the payment date. This item, 1121, on the screen contains three items. These three items are the Day of Month item 1122, Month 1123 and Year 1124, with the current date automatically selected by default.

Beneath item 1121 is item 1128, a form field for entering the End Date for payments. There is a Day of Month item 1125, Month 1126 and Year 1127 items. Thus if a user were to choose to pay someone money "Weekly" with an End Date one year later, then 52 payments would be made in one embodiment.

Under item 1128 is a form field denoted by 1129, the "Number of Payments" form field, into which the user can enter a number. Thus, if two payments were scheduled, the payments would cease after the second payment was made.

Below 1129 is item 1130, a button, which is the "No end date" option. This is not selected by default, but by clicking this item, future transactions can be programmed for completion, at the frequency the user has chosen to select by using item 1120, with options including "Weekly" or "Fortnightly".

Below item 1130 is item 1116, the button that is touched in order to submit an instruction to transfer money from the account of the current user into the account of the person whose details are shown at 1117.

Figure 9:
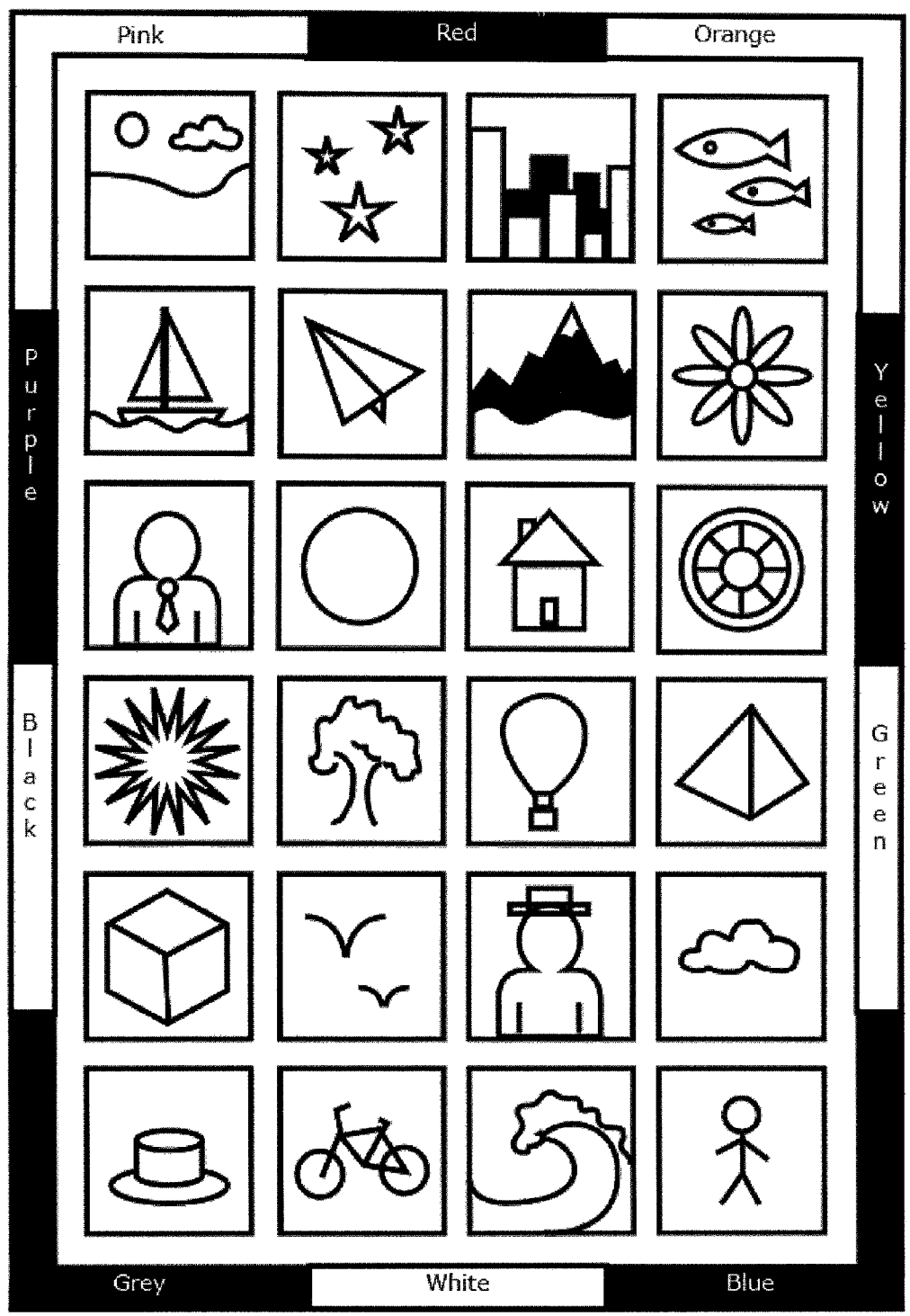
FIG. 9 discloses a facility for authenticating a user.

When button 1116 is actioned the screen refreshes and shows the items depicted in FIG. 9.

FIG. 9

FIG. 9 has a narrow outer zone that is divided up into ten colour sub-zones. The image depicted in FIG. 9 is further divided up into four vertical columns containing six images in each column. This object provides a facility for authenticating a person attempting to make a transaction.

The owner of each financial account within the system will have previously recorded a "Swipe" movement that can be reproduced by interacting with the items depicted in FIG. 9.

The user will touch one of the small pictures in the boxes in the central area and drag their finger to the edge of the screen, crossing over a particular coloured zone. For example, a user may touch their finger on the bicycle and drag their finger over to the black zone on the edge of the screen.

If the user reproduces the expected "Swipe" movement the user can be authenticated as a valid user.

In use, the system can require that a user perform two swipe actions. The user can choose to swipe the same image twice or they can swipe first one image and then another. If the user is required to touch and then swipe twice, the mathematical probability, in one embodiment, of a random person being able to reproduce that action and be "authenticated" is 57,600 to 1 against the person choosing the correct swipe movement.

If the user is authenticated, the user will see now see a message saying that their transaction has been successfully processed. If they provide incorrect input, the system will respond to that event accordingly.

This completes the processing of a Payment as seen from the point of view of a user of the system.

Additional to this process, that is visible to the user, the banking service that supports the payments system can receive and assess other data from the mobile phone, and this other data that underpins the payments service is included in the technology of the current invention (in one preferred embodiment).

Figure 8:
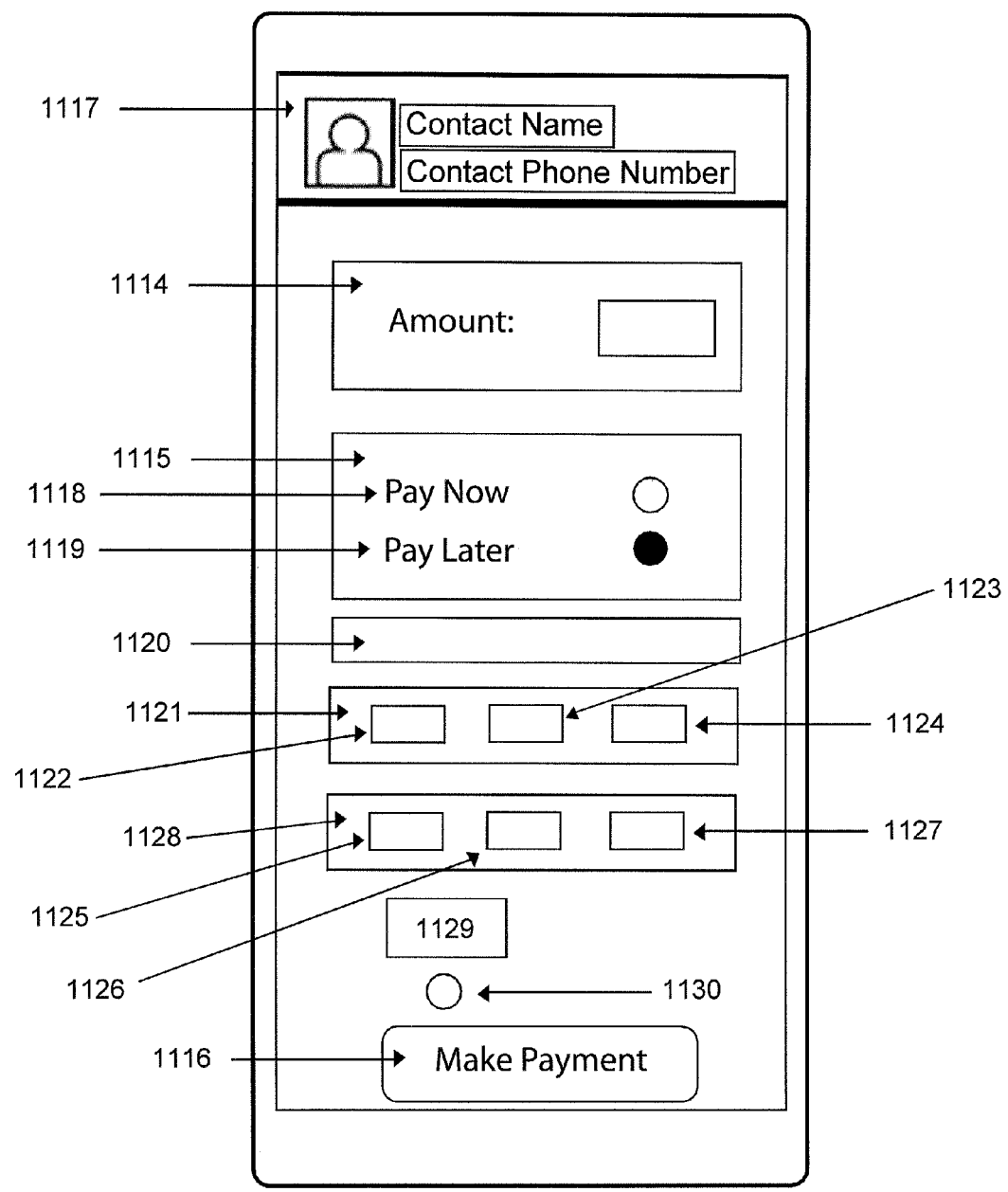
FIG. 8 discloses further details to permit a user to transfer money from their account into the account of a third party.

As seen in FIG. 1 in the main body of the specification, when a user actions the button 1116 shown in FIG. 7 and FIG. 8, the data in the form they have submitted can be immediately communicated through the mobile phone network to a banking service. Alternatively, and advantageously, the system can be configured so that details within the form can be saved or recorded in memory in the hand held device until the next stage of the Payments Process is completed, (the "Swipe" movement taking place through interaction with the touchscreen 1131 as seen in FIG. 9).

In one preferred embodiment, when the "Swipe" movement (credentialing operation) discussed in the context of FIG. 9 above is completed, an array of data is sent from a mobile phone device to the networked servers of a banking service provider. The form details entered by the user comprise one half of this array of information.

The second half of this array of data sent from the mobile phone is a component comprising three items. These three items are a Location Identifier 16, a Device Identifier 14, and a Password 12. An additional layer of encryption (asymmetric or symmetric) can be added to safeguard the latter three items.

The Location Identifier 16 can include the latitude and longitude of the current device. The Device Identifier 14 can include the IMEI number that is unique to the device. The Password can include data derived from a "Swipe" gesture which, if two swipe movements are utilized, is a swift and convenient movement for encoding a Password that an unauthorized person with a stolen phone in their hands is extremely unlikely to guess, given that the odds of choosing the proper movement are, in one embodiment, 57,600 to 1 against this movement being reproduced at random.

When the networked banking service receives the above data sent from a specific mobile phone which is identifiable by (i) it's IMEI number (ii) a specific location (that can be identified in one embodiment by a specific latitude and longitude) and (iii) a Password encoded in association with a "Swipe" movement, then the banking service can receive an array of data that makes it possible to determine whether the transaction should be approved. A further layer of security can be added to the three packeted indicia recited above (IMEI, specific location and password), being a layer of symmetric or asymmetric encryption.

The system described above enables a secure mobile phone banking system to process transactions on behalf of account owners with smartphones.

Copyright in drawings the subject of this application is reserved and remains the property of NOWWW.US Pty Ltd ACN 137 333 709 and its assigns.

What is claimed is:

1. A portable communication device encoded with instructions to execute steps comprising:
   a) authorizing access to a computer system based upon location of the device;
   b) authorizing access to the system using a permanent device identifier;
   c) authorizing access to the system using a password entered into the device;
   d) authorizing access to the system using temporal synchronization, where the device's operations are encrypted.

2. The device as recited in claim 1, where the password is entered using a swipe gesture.

3. The device as recited in claim 1, further encoded to perform steps comprising: authorizing access to the system using biometric authentication.

4. The device as recited in claim 1, where the instructions are encrypted using asymmetric key encryption.

5. The device as recited in claim 1, further encoded to perform steps comprising: manually overriding access to the system by way of direct personal oversight.

6. A portable communication device comprising:
   a) means for authorizing access to a computer system based upon location of the device;
   b) means for authorizing access to the system using a permanent device identifier;
   c) means for authorizing access to the system using a password entered into the device;
   d) means for authorizing access to the system using temporal synchronization, where the device's operations are encrypted.

* * * * *